(12) United States Patent
Dixit et al.

(10) Patent No.: US 11,004,256 B2
(45) Date of Patent: May 11, 2021

(54) COLLABORATION OF AUGMENTED REALITY CONTENT IN STEREOSCOPIC VIEW IN VIRTUALIZED ENVIRONMENT

(71) Applicant: Citrix Systems, Inc., Fort Lauderdale, FL (US)

(72) Inventors: Pawan K. Dixit, Bangalore (IN); Mudit Mehrotra, Bangalore (IN)

(73) Assignee: Citrix Systems, Inc., Fort Lauderdale, FL (US)

(*) Notice: Subject to any disclaimer, the term of this patent is extended or adjusted under 35 U.S.C. 154(b) by 0 days.

(21) Appl. No.: 16/406,789

(22) Filed: May 8, 2019

(65) Prior Publication Data
US 2020/0357165 A1    Nov. 12, 2020

(51) Int. Cl.
*G06T 15/20*    (2011.01)
*G06T 19/00*    (2011.01)
*G06F 3/01*     (2006.01)

(52) U.S. Cl.
CPC ........... G06T 15/205 (2013.01); G06F 3/011 (2013.01); G06T 19/006 (2013.01); G06T 2200/04 (2013.01); G06T 2200/08 (2013.01)

(58) Field of Classification Search
CPC . G06T 15/205; G06T 19/006; G06T 2200/08; G06T 2200/04; G06F 3/011
See application file for complete search history.

(56) References Cited

U.S. PATENT DOCUMENTS

| 10,497,180 | B1* | 12/2019 | Perfilev .............. G06T 19/006 |
| 2008/0301566 | A1 | 12/2008 | Abdo et al. |
| 2010/0194753 | A1 | 8/2010 | Robotham et al. |
| 2015/0070347 | A1 | 3/2015 | Hofmann et al. |
| 2017/0087465 | A1 | 3/2017 | Lyons et al. |
| 2017/0359571 | A1* | 12/2017 | Liu .................. H04N 13/275 |
| 2018/0063517 | A1* | 3/2018 | Wang ................ H04N 13/324 |
| 2020/0175764 | A1* | 6/2020 | Romea .............. G06T 19/006 |

FOREIGN PATENT DOCUMENTS

WO    2012007764    1/2012

* cited by examiner

*Primary Examiner* — Tapas Mazumder
(74) *Attorney, Agent, or Firm* — Banner & Witcoff, Ltd.

(57) ABSTRACT

Systems and methods for rendering an Augmented Reality ("AR") object. A method for an AR object includes overlaying a first bitmap of an AR object rendered by a first virtual camera initialized by a server on a first display of a client device and overlaying a second bitmap of the AR object rendered by a second virtual camera initialized by the server on a second display of the client device. The first bitmap and the second bitmap appear as the AR object being located at a depth distance from the client device in a stereoscopic view.

26 Claims, 9 Drawing Sheets

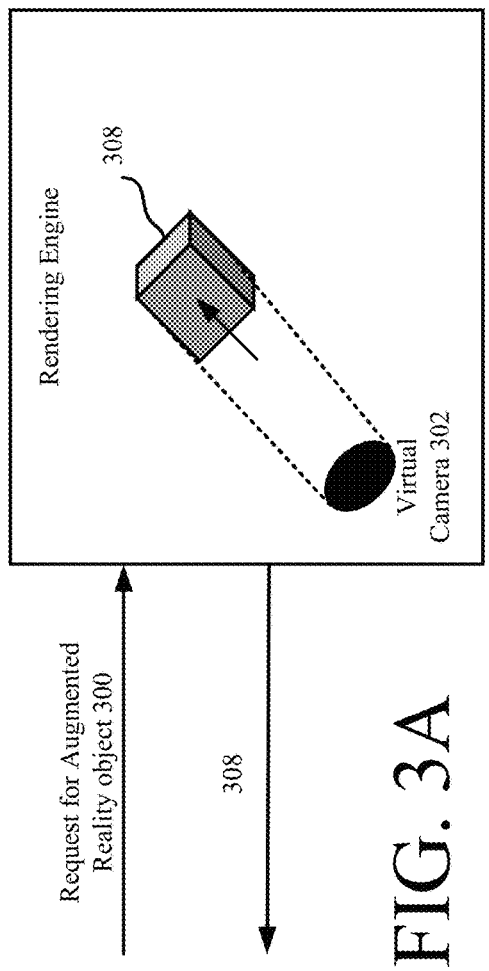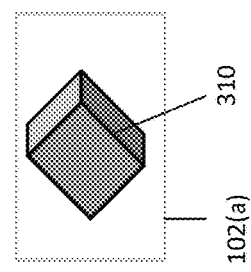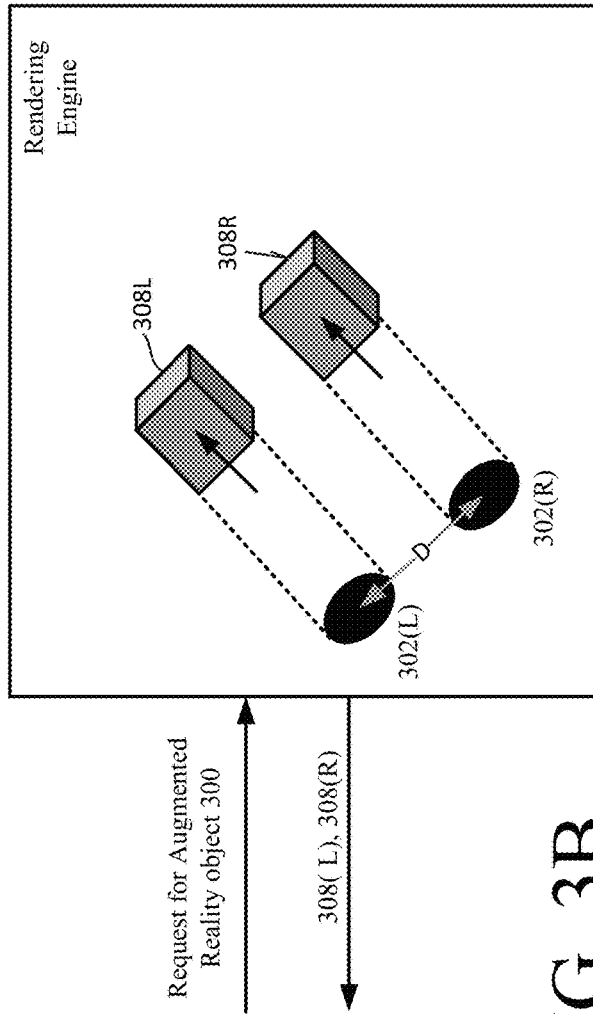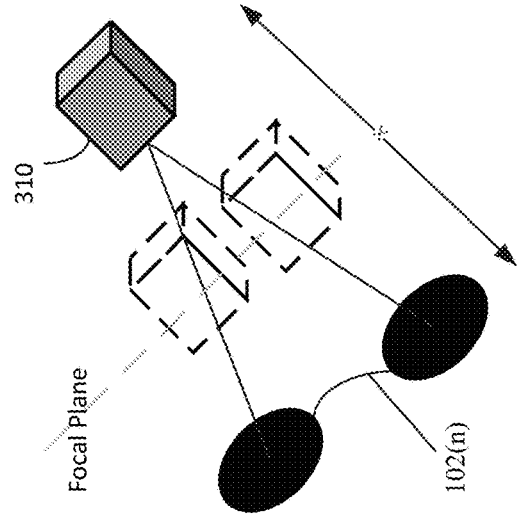
FIG. 3A
FIG. 3B

COLLABORATION OF AUGMENTED REALITY CONTENT IN STEREOSCOPIC VIEW IN VIRTUALIZED ENVIRONMENT

BACKGROUND

Statement of the Technical Field

The present disclosure relates generally to computing systems. More particularly, the present disclosure relates to implementing systems and methods for augmented reality in a virtualized environment.

BACKGROUND

Augmented Reality ("AR") is a technology that superimposes computer-generated graphics on a user's view of the real world, thus providing a composite augmented view. Accordingly, AR software applications show virtual objects on top of a real world scene while looking through a camera or transparent display. The AR software applications essentially draw bitmaps on top of the camera's view and move those bitmaps according to camera's motion so as to create an illusion of a virtual object present at a location in the real world. As a result, a typical AR system is designed to enhance, rather than to replace, one's current perception of reality.

An AR software application actually contains a model of the virtual object. When the AR software application requests a virtual object to be shown in the real world, this model of the virtual object is rendered locally on the client device, and rendered bitmaps are painted on top of the camera's view. This causes limitation to the AR experience because client devices are typically small portable devices (e.g., mobile devices, head mounter glasses, etc.) that have limited computing resources that limit the rendering of device-generated objects. For example, the model of the AR software application is not scalable because all the Hi-Fidelity 3D models related to an AR experience have to reside on the client storage at the same time. The model of the AR software application is quite computationally expensive on the client side because all models are rendered on a General Processing Unit ("GPU"), Central Processing Unit ("CPU"), or other limited computing resource of the client device. Furthermore, the management of the virtual models/images/animations becomes a tedious task because the same reside in each and every client device. This problem may be exacerbated during generation of a stereoscopic view of an AR object that requires rendering of two or more virtual images that are perceived at a depth from the AR device. A brute-force virtualization by moving an AR software application and model to the server-side would result in an inferior and laggy experience for the end user.

SUMMARY

The present disclosure concerns implementing systems and methods for rendering an AR object. In one or more scenarios, a method for rendering an Augmented Reality ("AR") object may include overlaying a first bitmap of an AR object rendered by a first virtual camera initialized by a server on a first display of a client device and overlaying a second bitmap of the AR object rendered by a second virtual camera initialized by the server on a second display of the client device. The first bitmap and the second bitmap appear as the AR object being located at a depth distance from the client device in a stereoscopic view.

The method may also include performing operations by the server to initialize the first virtual camera and the second virtual camera that are located at a first distance from each other. The first distance may be a function of a second distance of an anchor point from the client device in the physical environment of the client device. Optionally, the method may also include receiving user feedback to adjust the first distance. The method may be performed by a processor, by for example, executing one or more programming instructions stored in a non-transitory computer readable memory.

In one or more scenarios, the method may also include performing operations by the server to adjust the first distance in response to movement of the client device with respect to an anchor point of the AR object. Optionally, the server may render the AR object as an updated first bitmap and an updated second bitmap, and transmit the updated first bitmap and the updated second bitmap to the client device. The client device may overlay the updated first bitmap on the first display and the updated second bitmap on the second display.

In certain scenarios, the method may include operating the server to determine whether the client device is configured to support a stereoscopic view. The server may determine that the client device is configured to support a stereoscopic view if the client device is a head mounted display (HMD). Optionally, the first display is either a left eye display of the client device or a right eye display of the client device, and the second display is other one of the left eye display or the left eye display of the client device.

In at least one scenario, the method may also include, operating the server to receive a local map corresponding to a local physical environment of the client device, and using the local map to identify an anchor point for placement of the AR object with respect to one or more objects in the local map. The local map may include a plurality of tagged objects in the local physical environment of the client device.

In one or more scenarios, the method may include receiving a request from a second client device to visualize the AR object, rendering a third bitmap of the AR object by at least a third virtual camera initialized by the server, and overlaying the third bitmap of the AR object on a display of the second client device. The pose of the third virtual camera may be constrained to the second client device such that the AR object is perceived by the second client device within the second client device's physical environment. The method may also include manipulating the AR object at the client device, rendering a fourth bitmap of the AR object by the third virtual camera, wherein the fourth bitmap corresponds to the manipulated AR object, and overlaying the fourth bitmap of the AR object on the display of the second client device. Optionally, the method may include the AR object at the second client device, overlaying a fourth bitmap rendered by the first virtual camera on the first display of the client device, and overlaying a fifth bitmap rendered by the second virtual camera on the second display of the client device, wherein the fourth bitmap and the fifth correspond to the manipulated AR object.

In one or more scenarios, a device may include a processor and a non-transitory computer readable medium containing programming instructions. The programming instructions may cause the processor to: provide at least two virtual cameras separated by a distance to generate an augmented reality (AR) model of a virtual object, the at least two virtual cameras being separated by a distance, determine the distance between the at least two virtual cameras based on a depth distance of an anchor point of the virtual object from a client device, and provide information from the at least two virtual cameras to the client device for displaying the virtual object as the AR model at the anchor point in a stereoscopic view in the physical environment of the client device. The anchor point may correspond to a location within a physical environment of the client device. Optionally, the processor may receive user feedback for adjusting the distance.

In certain aspects, the processor of the device may receive information relating to a change in the depth distance of the anchor point (e.g., from the client device), and may then determine the distance between the at least two virtual cameras based on the received information.

In certain other aspects, the processor of the device may receive a request from a second client device to visualize the AR model, render the AR model by at least a third virtual camera, and transmit the AR model to the second client device for display. The pose of the third virtual camera may be constrained to the second client device such that the AR model is perceived by the second client device within the second client device's physical environment.

In one or more scenarios, a client device may include a first display, a second display, processor and a non-transitory computer readable medium containing programming instructions. The programming instructions may cause the processor to overlay a first bitmap image of an AR object on the first display, and overlay a second bitmap image of the AR object on the second display. The first bitmap and the second bitmap appear as the AR object being located at a depth distance from the client device in a stereoscopic view, the depth distance being a function of a first distance between a first virtual camera and a second virtual camera rendered by a server. Optionally, the processor may receive the first bitmap and the second bitmap from the server.

In certain aspects, the first display is either a left eye display of the client device or a right eye display of the client device, and the second display is other one of the left eye display or the left eye display of the client device.

BRIEF DESCRIPTION OF THE DRAWINGS

The present solution will be described with reference to the following drawing figures, in which like numerals represent like items throughout the figures.

FIGS. 3A and 3B provide illustrations that are useful for understanding an AR object rendering in accordance with the present solution.

DETAILED DESCRIPTION

Figure 1:
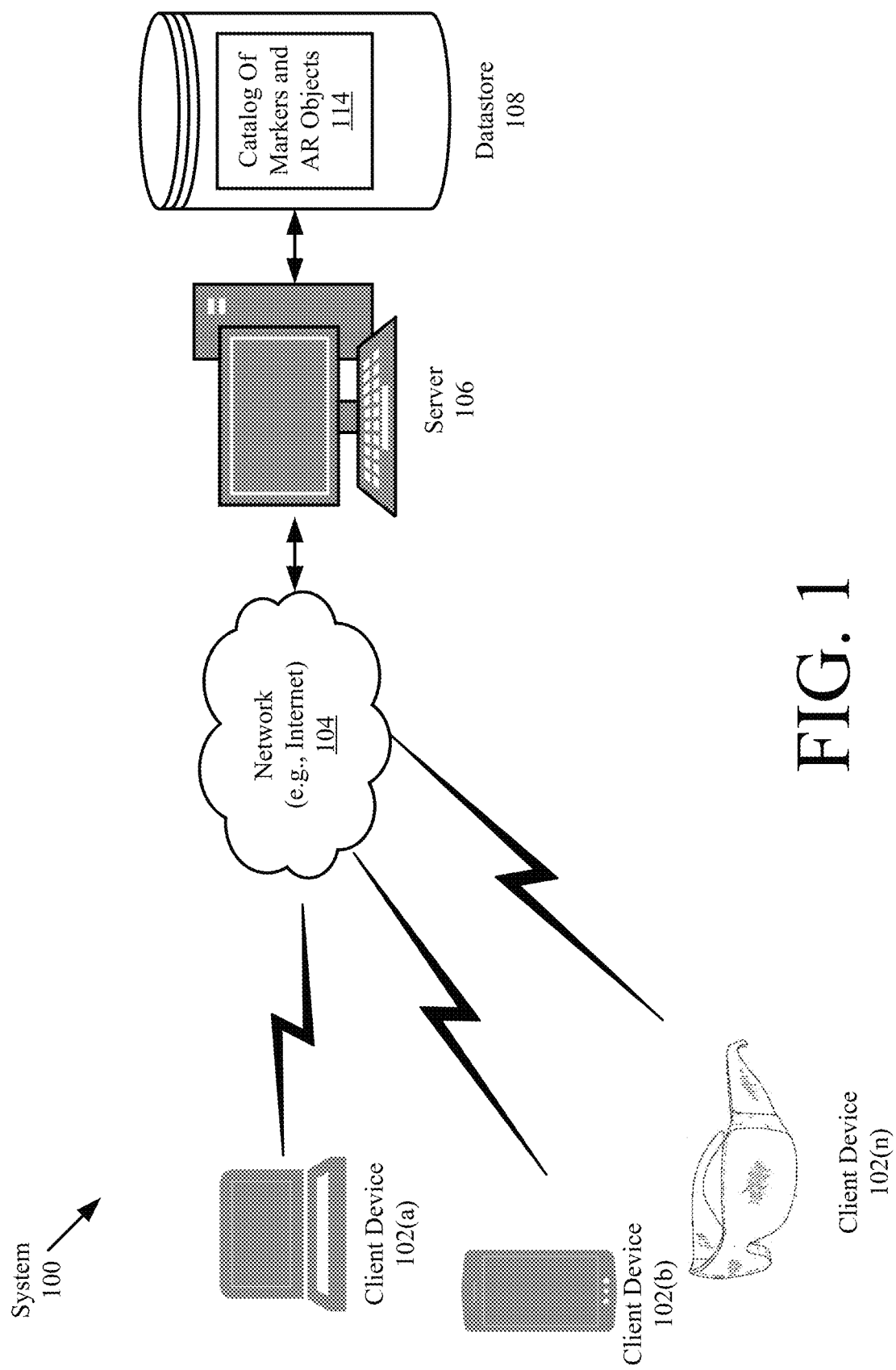
FIG. 1 is an illustration of an illustrative system.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present solution may be embodied in other specific forms without departing from its spirit or essential characteristics. The described embodiments are to be considered in all respects only as illustrative and not restrictive. The scope of the present solution is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present solution should be or are in any single embodiment of the present solution. Rather, language referring to the features and advantages is understood to mean that a specific feature, advantage, or characteristic described in connection with an embodiment is included in at least one embodiment of the present solution. Thus, discussions of the features and advantages, and similar language, throughout the specification may, but do not necessarily, refer to the same embodiment.

Furthermore, the described features, advantages and characteristics of the present solution may be combined in any suitable manner in one or more embodiments. One skilled in the relevant art will recognize, in light of the description herein, that the present solution can be practiced without one or more of the specific features or advantages of a particular embodiment. In other instances, additional features and advantages may be recognized in certain embodiments that may not be present in all embodiments of the present solution.

Reference throughout this specification to "one embodiment", "an embodiment", or similar language means that a particular feature, structure, or characteristic described in connection with the indicated embodiment is included in at least one embodiment of the present solution. Thus, the phrases "in one embodiment", "in an embodiment", and similar language throughout this specification may, but do not necessarily, all refer to the same embodiment.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

As used herein, the terms "AR object", "AR content" or "virtual object" interchangeably refer to a virtual representation or an image that is presented to a user as overlaid over a real-world view of the user's physical environment. Examples of AR objects include, but are not limited to, text, images, models, icons. The user may view and/or interact with AR objects.

As used herein, the term "registration" refers to the alignment of real and virtual objects. If the illusion that the virtual objects exist in the same 3-D environment as the real world is to be maintained, then the virtual object must be properly registered (i.e., aligned) with the real world at all times. For example, if the desired effect is to have a virtual soda can sitting on the edge of a real table, then the soda can must appear to be at that position no matter where the user's head, on which a HMD is mounted, moves. If the soda can moves around so that it floats above the table, or hangs in space off to the side of the table, or is too low so it interpenetrates the table, then the registration is not good.

Two different types of display, namely, video see-through and optical see-through, are used to enhance the user's visual perception of real objects in existing AR systems. In a typical video see-through system, the user sees a live video of a real-world scenario, including one or more particular objects augmented or enhanced on the live video. This type of video see-through system is suitable for various applications, such as video on a phone display, head mounted-device (HMD) that employs opaque screens, or the like. In an optical see-through system with AR features, the user sees objects augmented directly onto the real-world view without a video. In a typical optical see-through system, the user may view physical objects through one or more screens, glasses, or lenses, for example, and computer-enhanced graphics may be projected onto the screens, glasses or lenses to allow the user to obtain enhanced visual perception of one or more physical objects. One type of display used in an optical see-through AR system is an HMD having a glass in front of each eye to allow the user to see an object directly, while also allowing an enhanced image of that object to be projected onto the glass to augment the visual perception of that object by the user.

HMDs typically utilize a combination of optics and stereopsis to focus virtual imagery at a fixed distance from the HMD (i.e., stereoscopic image) using parallax. In normal human binocular vision, each eye views the world from a slightly different perspective. The difference in the view from each eye, also called parallax, is caused, in part, by the spatial separation between the eyes. In general, the amount of parallax is increased for objects that are closer to the viewer as compared to objects that are further from the viewer. The brain is able to combine the different views from each eye and use the parallax between views to perceive the relative depth of real-world objects.

Parallax may be generated for AR by shifting the images placed on left and right displays of an HMD. By setting an amount of parallax for an AR object, its virtual distance is implied by the distance at which line of sight to the AR object generated by the left eye display intersects the corresponding line of sight for the right eye display. Stereoscopic augmented reality environments provide different perspective views to a user's left and right eyes, enabling a user to perceive three-dimensional AR objects. The human brain fuses the perspective views from the left and right eyes into one cognitive experience called stereopsis, which allows the brain to perceive the AR objects in stereo. However, as noted above, in conventional AR devices the AR object rendering for generating perspectives for the left and right eyes of the user (i.e., creation of two distinct AR models) is performed on the client device (i.e., the HMD) itself, requiring large amounts of processing ability which is typically not suitable for a client device.

Furthermore, users would benefit from augmented reality experience that is shared between both co-located users and remote users. With traditional vision based augmented reality systems, computer generated information is added to a real, local scene. Visualizing a remote environment with overlaid computer generated AR graphics is hereinafter referred to as remote augmented reality. Remote augmented reality is useful for tasks, for example, where an expert is located at a distance from where a physical task is to be executed, such as inspection in hazardous environments, and service and support tasks.

It should be noted that camera or video camera as used herein are generally intended to include any imaging device, non-limiting examples of which may include infrared cameras, ultraviolet cameras, as well as imagers that operate in other areas of the spectrum such as radar sensors.

The present solution concerns systems and methods for providing a stereoscopic view of an AR object in a real world environment, and controlling the rendering of an AR object at least partially on a server side. The AR session/object may be shared between both co-located and remote users. As noted above, AR is a technology that superimposes a computer-generated image on a user's view of the real world, thus providing a composite view. The terms render and rendering refer to an automatic process of generating a 2D or 3D image (typically a bitmap image) of an object on a computer from a model (e.g., a 2D or 3D object model) by means of application programs, as should be known. The solution can be used in virtualize AR software applications. According to various aspects of the current disclosure, the computationally expensive rendering of AR objects happens on a server and rendered bitmaps are sent to a client device (or other end node) for display. A bitmap is a map of bits in which each item corresponds to one or more bits of information, especially the information used to control the display of a computer screen. At the same time, an AR application running on the client device is able to leverage tracking methods such as, without limitation, Simultaneous Localization And Mapping ("SLAM") using sensors on the client device (e.g., ambient lighting sensor data, accelerometer sensor data, camera data, etc.) to accurately position the rendered bitmap image on the real-world view to create an AR view. SLAM generally refers to the process of constructing or updating a map of an unknown environment while simultaneously keeping track of the client device's location within it.

The image of an AR object may be rendered by initializing a virtual camera that controls the rendering process, which is then superimposed (or drawn) on the real world view captured using a real camera to generate the AR view. It will be appreciated that all apparent optical effects of the virtual camera are entirely the result of computation performed by the rendering software and there are no real optical effects involved in the rendering process. To be most useful, the AR view should be highly accurate and the computer generated features of the AR object need to be registered accurately with the physical features of the real world environment. This registration needs to be maintained through viewing perspective changes. In order for the rendered AR object and the real world environment of a user to align properly, the pose and optical properties of the real and virtual cameras must be the same. The position and orientation of the real and virtual objects in some world coordinate system must also be known. The locations of the geometric models and virtual cameras within the AR environment may be modified by moving its real counterpart. This is accomplished by tracking the location of physical objects and using this information to update the corresponding transformations within the virtual world. This tracking capability may also be used to manipulate purely virtual objects, ones with no real counterpart, and to locate real objects in the environment. Once these capabilities have been brought together, real objects and computer-generated graphics may be blended together, thus augmenting a dynamic real scene with information stored and processed on a computer. In general, "initialization" refers to techniques used to determine the initial position and orientation (i.e., the initial pose) of a real camera that captures a view of the physical environment to be augmented and using it to initialize a virtual camera with the same pose.

Typically, the virtual camera is initialized on the client device, which as discussed above is computationally expensive. However, as described below, the rendering of an AR object may be performed on the server side by initializing a virtual camera on the server. The present solution provides many novel features. In this regard, it should be understood that the present solution supports sensing on the client device and the server's AR engine. The server device of the present solution can initialize two virtual cameras for rendering two bitmap images of an AR object if the client device requesting the AR session supports stereoscopic display of the AR object (e.g., an HMD). Furthermore, the server device can initialize one or more virtual cameras for each client device that may be collaboratively viewing and/or interacting with an AR object, and may separately control the pose of virtual camera(s) corresponding to the associated client device.

Optionally, each client device can receive a part of the AR object from the server, render the remaining AR object part locally (e.g., scenarios where there exist network constraints), and paint a bitmap image of the locally rendered AR object part on top of an AR bitmap projection being received from the server for high fidelity and fluidity when working on that particular AR object part. In this regard, it should also be understood that the present solution supports rendering on the client device and the server's AR engine. An AR application is divided into two parts: a first part running on the client device that performs SLAM; and a second part (rendering engine) that renders the AR object as one or more bitmaps on the server. The server sends rendered bitmaps to the client device. The client device then draws received bitmaps by using, for example and without limitation, the anchor points identified by client device. An anchor point is a location of a marker in the real world. For example, a Citrix Virtual Applications and Desktops may be used as a server with the rendering engine. A Citrix Workspace Application launches the rendering engine as a virtualized application that talks to a SLAM engine running as a local application on the client device. The present solution is not limited to the particulars of this example.

When network constraints exists that make it difficult for the client device to update an AR object in real-time during, for example, user-interactions, the present solution also supports a local-like, fluid AR experience by rendering a sub-part of the virtual object on the client device. Two copies of a rendering engine application are provided. A first copy of the rendering engine is published as a virtual application on the server. A second copy of the rendering engine runs locally on the client device. Depending on the desired fidelity and fluidity requirement, a sub-part of the virtual object (or AR model)—example a part that a user is interacting with, manipulating and/or a part that is in focus—may be fetched as an object file on the client device and rendered locally using the second copy of the rendering engine. The bitmap of the sub-part of the virtual object will then be superimposed on the bitmap of the complete AR model, which was rendered at the server by the first copy of the rendering engine. So in this way, even when the fidelity and fluidity of the complete AR model bitmap may not be very high in low-bandwidth conditions, the focused subpart will have higher fidelity and fluidity of interaction (move around the model, move closer to the model, etc.) as it was rendered locally and there is no delay in interaction.

The present solution further supports creation of local maps on a client device for storage on the server. The local maps may be used for initialization of an AR session for providing the physical real-world view of the AR session without repetitive extensive mapping and localization performed on the client device. The local maps may also include tagged objects present in the physical environment. The tagged objects may be used to place AR content where they are most relevant.

Illustrative System

As previously described, conventional AR systems require rendering of the AR object image on the client device which requires computationally expensive processing and may not be feasible on the client device. This is particularly cumbersome during generation of a stereoscopic view of an AR object because it requires rendering of at least two images of the AR object. Moreover, the at least two images must be re-rendered to allow the virtual object to move in and out of focus as it would if the user saw the virtual object with natural sight when the client device is moved with respect to the AR object. Similarly, during collaborative AR sessions the AR object must be separately rendered on all collaborating devices. Also, conventional AR systems present a single AR model to each user, and thus there is no correlation between views of multiple system users. This poses a significant challenge when more than one user edit, annotate or other work on the same model because the systems are not configured to aggregate changes made in one or multiple versions of the same AR model.

Referring now to FIG. 1, there is provided an illustration of an illustrative system 100 implementing the present solution. The present solution solves the above stated problems with conventional AR systems by implementing a stereoscopic rendering process for an AR object; and generation and execution of collaborative AR sessions. Further, the AR systems of the current solutions may utilize previously created and stored local maps of a physical environment during an AR session. The local maps may also include information relating to classified objects in the physical environment for, for example, automatic determination of anchor points for AR objects.

As shown in FIG. 1, system 100 comprises client devices 102a-n, a network 104 (e.g., the Internet), a server 106 and a datastore 108. The server 106 has access to a catalog of markers and AR objects 114 stored in the datastore 108. The database 108 may also be configured to store one or more local maps of physical environments, as described below.

The client devices 102a-n may be any device associated with a user that is configured to perform one or more operations consistent with the disclosed embodiments. In some scenarios, client devices 102a-n may be configured in the form of an AR device, such as a HMD, tablet devices, mobile phone(s), laptop computers, and any other computing device(s). It will be understood that the present disclosure is not limited to augmented reality glasses or any one type of AR device. For example, a relatively simple AR device might involve a projector with a camera interacting with the surrounding environment, where the projection could be on a glass surface or on top of other objects.

Each client device 102a-n may include one or more displays configured for providing AR content to a user. For example, a display may include one or more translucent, transparent, or semi-transparent components configured to pass at least some light from a scene to the eyes of a user. The display may also include opaque lenses or components, e.g., where the images seen by the user are computer-generated, constitute light-guided projections of real world objects, or include images captured by one or more cameras (or other image acquisition devices) associated with client devices 102a-n. In such embodiments, generated, captured, and/or light-guided images of real world objects may be projected onto opaque or semi-opaque components associated with the display. Display may also project information using holographic images. Certain client devices such as HMDs typically support the display of an AR object in a stereoscopic view and include two displays —a right display and a left display. Such devices may include video see-through and/or optical see-through displays.

The client devices 102a-n may also include one or more sensors configured to provide an output signal useful in providing AR content to a user. Examples of sensors may include, without limitation, one or more GPS sensors, cameras, barometric sensors, proximity sensors, physiological monitoring sensors, chemical sensors, magnetometers, gyroscopes, accelerometers, bar code scanners, motion detectors, or the like. For example, an HMD may include sensors that provide the device's location, orientation, and bearing (for example, latitude, longitude, altitude, pitch, roll or degree tilt from horizontal and vertical axes, and compass heading) and/or camera sensors.

In one example of an AR environment of the current solutions, one or more users (e.g., collaborators) may move around a real-world environment (e.g., a meeting room) each associated with a client device, such as a smartphone, HMD, etc., that allow the one or more users to observe views of the real-world overlaid with images of AR objects that maintain coherent spatial relationship with the real-world environment (i.e., as a particular user turns their head or moves within the real-world environment, the virtual images displayed to the particular user will change such that the AR objects appear to exist within the real-world environment as perceived by the particular user). In another scenario, the observed views of the real-world overlaid with images of AR objects may maintain spatial relationship with only one primary user (e.g., a speaker in a meeting), and one or more secondary users may view the AR objects within the real-world environment as perceived by the primary user.

The server 106 may be a system configured to provide and/or manage services associated with providing AR content to users. In general, any type of AR content, including any desired form of information, can be provided from server 106 to a client device 102a-n based on the requirements of a particular application. In an example scenario, the server 106 may initialize one or more virtual cameras for rendering an AR object for a client device 102a-n. For example, the server 106 may determine that a client device 102a-n is an HMD that supports display of a stereoscopic view of the AR object, and initialize two virtual cameras for rendering AR objects for the client device 102a-n (as discussed below). Alternatively, the server 106 may determine that a client device 102a-n does not support display of a stereoscopic view of the AR object, and initialize only one virtual camera for rendering AR objects for the client device 102a-n The networks 104 may include a secure network such as an enterprise private network, an unsecure network such as a wireless open network, a local area network (LAN), a wide area network (WAN), and the Internet. Network 104 may include hubs, bridges, routers, switches, and wired transmission media such as a wired network or direct-wired connection.

Figure 2:
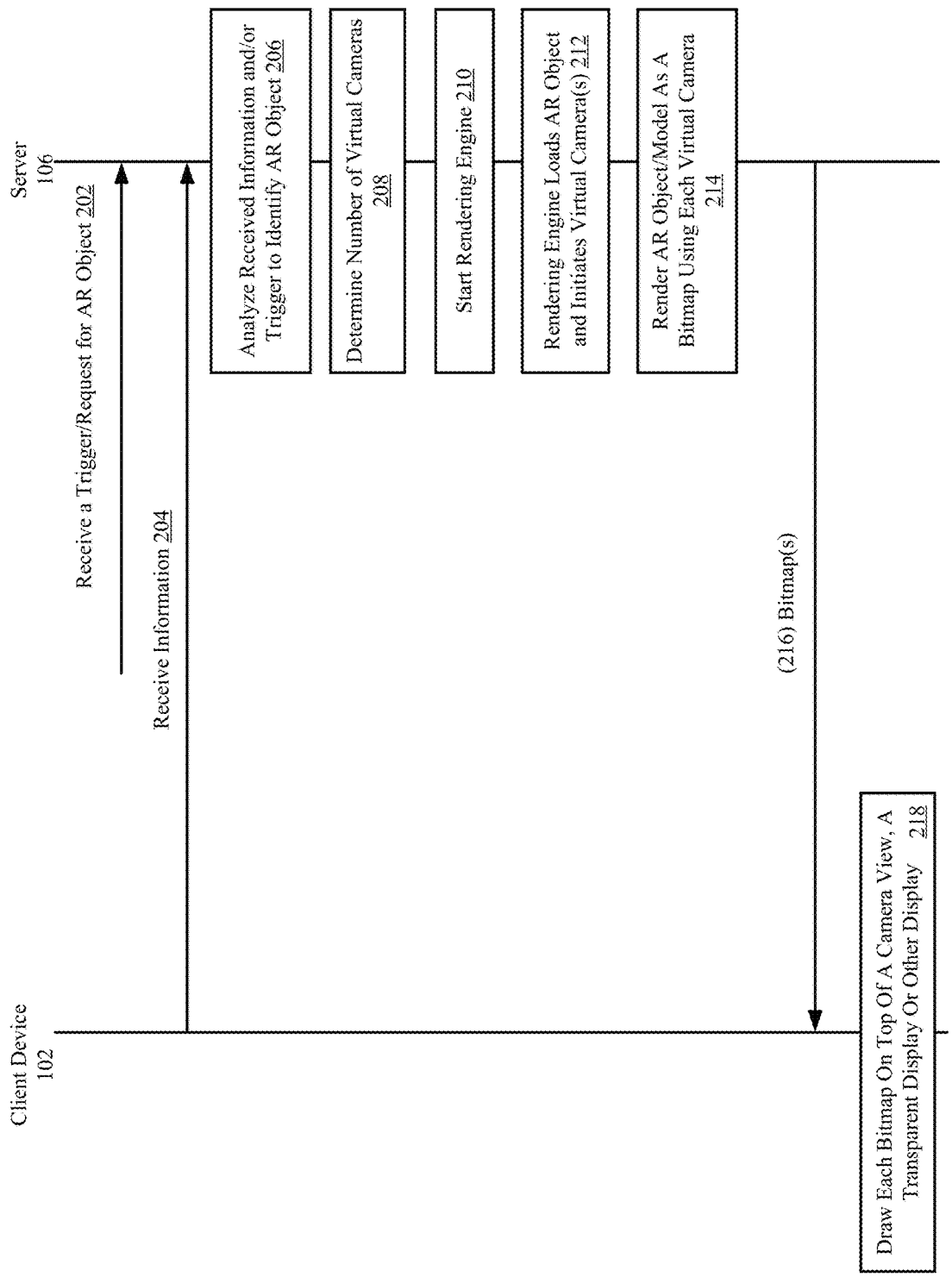
FIG. 2 is a message flow that is useful for understanding operations of the system shown in FIG. 1.

Stereoscopic image generation operations of system 100 will now be discussed in relation to FIG. 2. During operation, the server 106 may be triggered and/or may receive a request for placement of an AR object, as shown by 202. Consistent with the disclosure, server system 106 may provide AR content to client device based on information received from client device 102. For example, server 106 may determine that a request for AR object has been received based on a detected position, detected position change, or detected/determined context of user and/or client device 102. Such AR content may also be provided to a client device 102 based upon explicit requests received from the client device 102 or based on a detected and/or recognized object within a field of view of an imaging device associated with the client device 102 (e.g., markers). For example, markers may comprise a feature point in a real world scene. The feature point includes, but is not limited to, a barcode (e.g., a QR code), a landmark or a recognized object. Markers may be used to identify and retrieve AR objects from a catalog or sub-catalog. Further, any suitable trigger may be used to initiate transfer and/or updating of AR content provided to a client device 102 by the server system 106.

In another example, a beacon may be used to facilitate secure sever login for accessing AR content. In this regard, beacon may communicate beacon credentials to the client device 102. The beacon credentials may include, but are not limited to, a beacon identifier and/or a beacon location. The credentials for the client device 102 and the credentials for the beacon are then used to login to the server 106. The client device 102 credentials may include, but are not limited to, a device identifier, a user identifier, a code, an entity identifier, a user identifier, an account number and/or a password. The client device 102 and beacon credentials provide contextual information for the user. The contextual information may be analyzed by the server to determine if the client device 102 is allowed access to AR content. This analysis can involve: comparing client credentials to pre-stored client credentials to determine if a match exists therebetween; comparing beacon credentials to pre-stored beacon credentials to determine if a match exists therebetween; denying access to the AR content when results of one or both comparison operations indicates that a match does not exit; and allowing access to AR content when the results of one or both comparison operations indicates that a match does exit. Optionally, when access to the AR content is allowed, the server 106 may provide an access token to the client device 102. The server 106 may also create a sub-catalog of markers and AR objects/models that are available to the client device 102. This involves: accessing a full catalog of markers and AR objects/models in a datastore 108 (e.g., a database); and filtering markers and AR objects/models from the full catalog based on the contextual information for the user and beacon. The result of the filtering operations is a sub-catalog. The sub-catalog contains only the markers and AR objects that are made available when the circumstances specified by the contextual information exist. This sub-catalog (rather than the full catalog) is searched when requests for AR content from the client device 102 need to be fulfilled.

Upon receipt of a trigger or a request to show/place an AR object, the server 106 may also receive additional information from the client device 102 in 204. Examples of such additional information may include, without limitation, client device credentials, context information for the AR environment of a user of the client device, user information, AR object identifier and initial parameters that indicate an initial orientation and scaling of the requested AR object with respect to a camera, anchor point information (e.g., x, y, z coordinates), or the like. Notably, there may be more than one such anchor point. Each anchor point corresponds to one AR object being rendered and updated on the server 106. The additional information may also include information relating to the client device 102 such as, without limitation, whether or not the client device 102 is configured to support stereoscopic view (e.g., an HMD device), whether or not a user has requested a stereoscopic AR session, or the like.

The server 106 may use the received information to identify the AR object in 206 (by, for example, accessing the AR object catalog and/or sub-catalog. The server 106 may also identify the AR object based on the context of the client device 102 and/or the user as described below with respect to FIGS. 9 and 10 (using tagged object information in stored local maps). The server 106 may receive the model (e.g., design file) of the identified AR object.

Referring back to FIG. 2, the server 106 may then determine the number of virtual cameras to be initiated for rendering the AR object in 208. The number of virtual cameras to be initiated may depend on the type of client device. For example, if the client device 102 is configured to support stereoscopic view (e.g., an HMD), the server 106 may initiate two virtual cameras for rendering two images of the AR object —one for the right eye display of the client device 102 and another for the left eye display of the client device 102. However, if the client device 102 is not configured to support stereoscopic view, the server 106 may initialize only one virtual camera for rendering the AR object. The server 106 may identify the type of client device based on, for example, information received from the client device 102 (e.g., type of client device), context information corresponding to the client device, user information, user instructions requesting a stereoscopic display, or the like.

The server 106 then starts a rendering engine at 210. The rendering engine loads the identified AR object and initiates the determined number of virtual cameras at 212. The rendering engine also initiates a distance "D" between the two virtual cameras if the client device is a device that supports stereoscopic view as a function of the distance of the anchor point from the client device 102 (z-coordinate of the anchor point). For example, the distance D may be a function of triangulated distance of anchor point, and may be determined based on the values of on fixed parameters such as, for example, the focal length of the virtual cameras, camera view angles, image width, etc., using any method known to those of skill in the art. In certain scenarios, D may be inversely proportional to the distance of the anchor point from the client device 102 such that D may increase if the client device 102 moves closer to the anchor point and/or vice versa.

The pose (e.g., scope and orientation) of each virtual camera is set so that the scale and orientation of the AR object looking through the virtual cameras matches the received initial orientation and scaling specified in the request.

In certain embodiments, the distance D may be adjusted based on user feedback. For example, the rendering engine may initially position the two virtual cameras at an initial distance $D_{int}$ from each other and render the AR object on the left eye display and the right eye display of the optical see-through system. The initial distance $D_{int}$ may be a function of the distance of the anchor point from the client device 102 (z-coordinate of the anchor point). The user may then provide feedback (e.g., increase $D_{int}$ and/or decrease $D_{int}$) relating to the perceived image of the AR object in the AR environment that may be used to adjust $D_{int}$. For example, if $D_{int}$ is not optimal, the stereoscopic image of the AR object as perceived by the user may be appear as two different images as opposed to a single image located at a perceived depth. The user may therefore use a user interface element (e.g., a microphone to provide a spoken command) of the client device 102 to adjust $D_{int}$ until a single stereoscopic image of the AR object at the desired depth is perceived when the distance between the virtual cameras is D.

The rendering engine also loads the identified AR object model for rendering the bitmap image(s) of the AR object. The rendering engine renders the identified AR object as a separate bitmap using each initialized virtual camera, as shown by 214. Each rendered bitmap is then sent to the client device 102 in 216. For example, a single rendered bitmap is sent to the client device 102 if the client device 102 does not support stereoscopic view, and two rendered bitmaps are sent to the client device 102 if the client device supports stereoscopic view (one for the right eye display and one for the left eye display). It should be noted that while the current disclosure describes rendering of two bitmap images if the client device supports stereoscopic view, similar methods and systems may be used to generate a stereoscopic view in response to a user request for a stereoscopic view.

Upon receiving the rendered bitmap(s), the client device 102 overlays the bitmap(s) for display on top of a real camera view, a transparent display, and/or other display(s) of the client device in 218. For example, the bitmap(s) can be drawn in a display screen at the location of the anchor point that is being tracked using SLAM. Alternatively, the location of the anchor point may be tracked using previously stored local maps (described below).

A single rendered bitmap of the AR object can be drawn on the display of the client device 102 and seen as a single AR image if the client device 102 does not support stereoscopic display. In other examples, two rendered bitmaps are drawn on each display (left eye display and right eye display) of client device 102 if the client device 102 is configured to support stereoscopic view which are subsequently perceived by the user as a stereoscopic image of the AR object at a desired depth. Specifically, the left AR bitmap and right AR bitmap create a stereoscopic image of the AR object when viewed by a wearer of, for example, a HMD. The perceived AR object has an apparent real world size and an apparent real world depth determined by the size and location of each of the left rendered bitmap and right rendered bitmap on its respective display.

In certain embodiments, the sever 106 may completely render the bitmap(s) for the AR object. Alternatively and/or additionally, at least part of the bitmap(s) may be rendered at the client device 102. For example, when the client device is located in environments that have bandwidth constraints, network latency, or other factors that affect exchange of large amounts of data between the server and the client device, the client device may locally render parts of the bitmap that a user desires to interact with and/or manipulate in the AR session (because such locally rendered parts will be responsive to user interaction irrespective of network constraints). The remaining parts of the bitmap may be rendered by the server and may not be equally responsive to user interaction.

Figure 9:
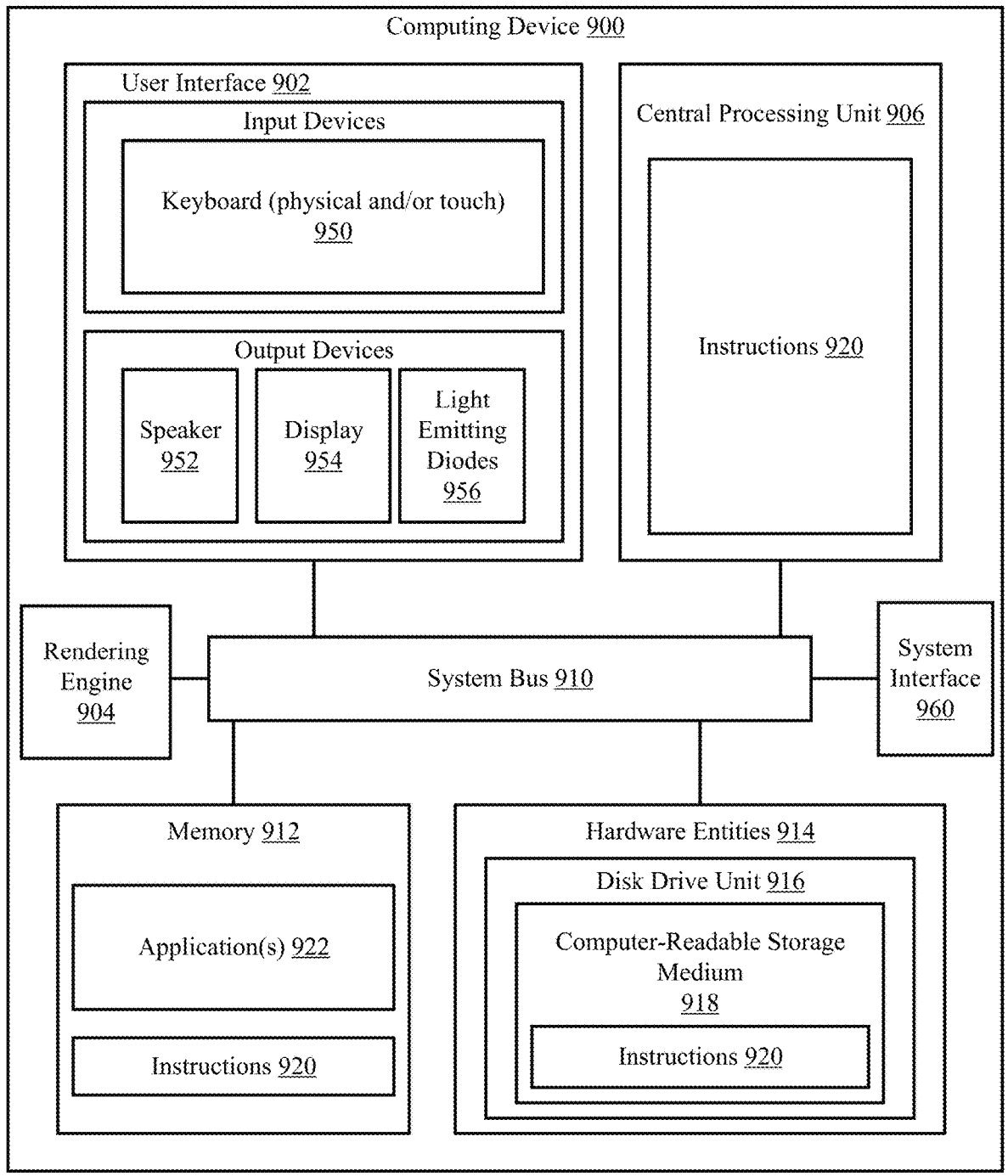
FIG. 9 provides a block diagram of an illustrative architecture for a computing device.

FIGS. 3A and 3B are illustrations that are useful for understanding operations of a rendering engine (e.g., rendering engine 904 of FIG. 9). If the server determines that the client device is not configured to support a stereoscopic view and/or the user has not requested a stereoscopic view, then in response to a request for an AR object 300, as shown in FIG. 3A, the rendering engine generates a single bitmap representing an AR object 308 when a virtual camera 302 has a given pose. The client device 102*a* (or 102*b*) may overlay the received bitmap 308 on an associated display to be viewed by a user as an AR object 310 without any stereoscopic effect.

On the other hand, as shown in FIG. 3B, if the server 106 determines that the client device 102(*n*) is configured to support a stereoscopic view and/or the user has requested a stereoscopic view, then in response to a request for an AR object 300, the rendering engine generates two bitmaps 308(L) and 308(R) for the left eye display and the right eye display of the client device 102(*n*). The client device 102(*n*) may overlay bitmap 308(L) on the left eye display and bitmap 308(R) on the right eye display, which when viewed by a user are perceived as a single AR object 310 located at a desired perceived distance "x" from the user (when two virtual cameras 302(L) and 302(R) are initialized). In order to display AR object 310 at the illustrated depth and location using stereoscopy, the client device displays the left bitmap 308(L) to the left eye of the user, and display the right bitmap 308(R) to the right eye of the user. The left bitmap 308(L) and the right bitmap 308(R) are rendered at the rendering focal plane 320 of the client device, and from the perspective of the left virtual camera 302(L) and the right virtual camera 302(R). As illustrated in FIG. 3B, the relative positions of the left virtual camera 302(L) and the right virtual camera 302(R) are separated by a distance "D" from each other. This distance D may be calibrated such that when viewing the left bitmap 308(L) and the right bitmap 308(R), the user will not actually perceive two different bitmap images but will perceive that the virtual object 308 exists at the depth and location illustrated in FIG. 3B.

While the left bitmap 308(L) and the right bitmap 308(R) are depicted in FIG. 3B as being identical, it is to be understood that each of the left and right bitmaps of the AR object may be the same, or each may be different (e.g., each may comprise an image of the same object, but from slightly different perspectives).

In certain embodiment, the distance "D" between the virtual cameras is inversely proportional to the perceived depth of the AR object. In other words, if the distance D is decreased the AR object appears to be located further from the client device 102 compared to when the distance D is increased. For example, if a user wearing a HMD moves closer to the AR object, the rendering engine may increase the distance between the left and right virtual cameras such that the AR object is perceived to be situated at a reduced distance to the user.

Figure 4:
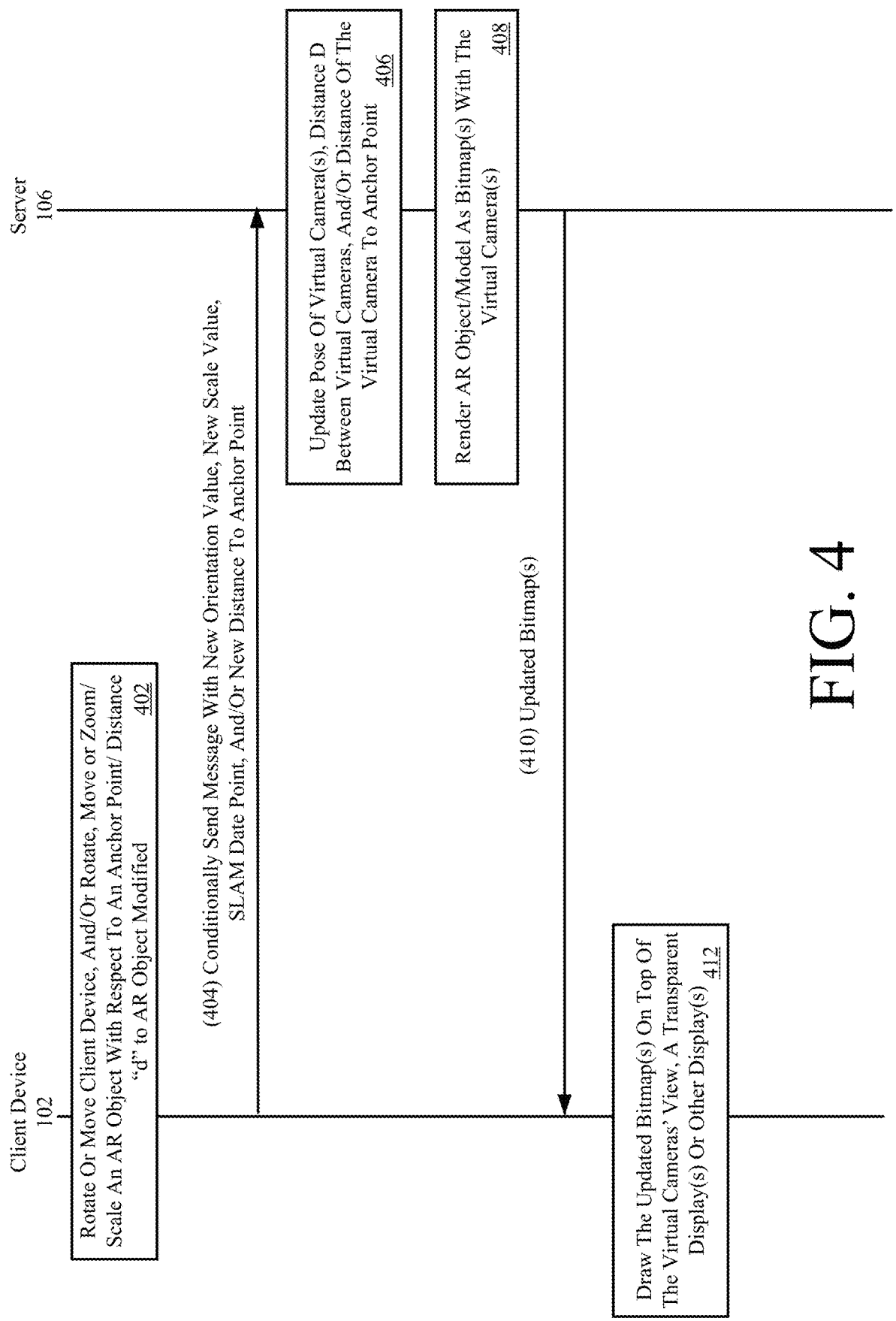
FIG. 4 is a message flow that is useful for understanding operations of the system shown in FIG. 1.

Referring now to FIG. 4, operations of system 100 will be described when (A) the client device 102 is rotated or moved, (B) an AR object is rotated or moved relative to an anchor point, (C) the AR object is zoomed in on, (D) the AR object's scale is modified, or (E) the distance "x" to the AR object is modified. For example, if a user moves with respect to an AR object, the stereoscopic distance of the AR object "d" is modified. The system may use any tracking and localization methods, such as SLAM, for registering the occurrence of (A), (B), (C), (D) and/or (E). When (A), (B), (C), (D) and/or (E) occurs as shown by 402, a message may be sent from the client device 102 to the server 106 in 404. The message includes a new orientation value, a new scale value, a new depth value or distance between the AR object and the client device 102, a SLAM data point, a new distance to an anchor point, and/or any other data point related to the client device's operation and/or use.

Upon receiving this information, the server 106 updates the initial pose of the virtual camera(s) (as described above in FIGS. 3A and 3B), the distance D between the virtual cameras (in case of optical see-through system) and/or the distance of the virtual camera to an anchor point accordingly, as shown by 406. The AR object/model is then rendered in 408 as a bitmap(s) using the virtual camera with the updated orientation, scope, depth, and/or distance. The updated bitmap(s) is then sent in 410 from the server 106 to the client device 102. Upon receiving the updated bitmap(s), the client device 102 overlays the updated bitmap(s) on top of the camera view (or on left side and right side camera views), a transparent display or other display as shown by 412. For example, the bitmap(s) is drawn in a display screen(s) at the location of the anchor point that is being tracked using SLAM.

In certain embodiments, the sever 106 may completely re-render the bitmap(s) for the modified AR object. Alternatively and/or additionally, at least part of the bitmap(s) may be rendered at the client device 102 (for example, the parts of the AR object that are modified by a user). Specifically, two copies of a rendering engine application are provided. A first copy of the rendering engine is published as a virtual application on the server. A second copy of the rendering engine runs locally on the client device. Depending on the desired fidelity and fluidity requirement, a sub-part of the virtual object (or AR model) may be fetched as an object file on the client device (for example, the parts that are modified by a user during the AR session and/or parts that are in focus during an AR session) and rendered locally using the second copy of the rendering engine. The bitmap of the sub-part of the virtual object will then be superimposed on the bitmap of the complete AR model, which was rendered at the server by the first copy of the rendering engine. So in this way, even when the fidelity and fluidity of the complete AR model bitmap may not be very high in low-bandwidth conditions, the focused subpart will have higher fidelity and fluidity of interaction (move around the model, move closer to the model, etc.) as it was rendered locally and there is no delay in interaction. This mixing may be achieved by drawing the local bitmap on top of the updated or re-rendered bitmap received from server 106 to produce the final bitmap. The final bitmap is then placed on the corresponding anchor point to create the modified AR object by each client device individually.

Figure 5:
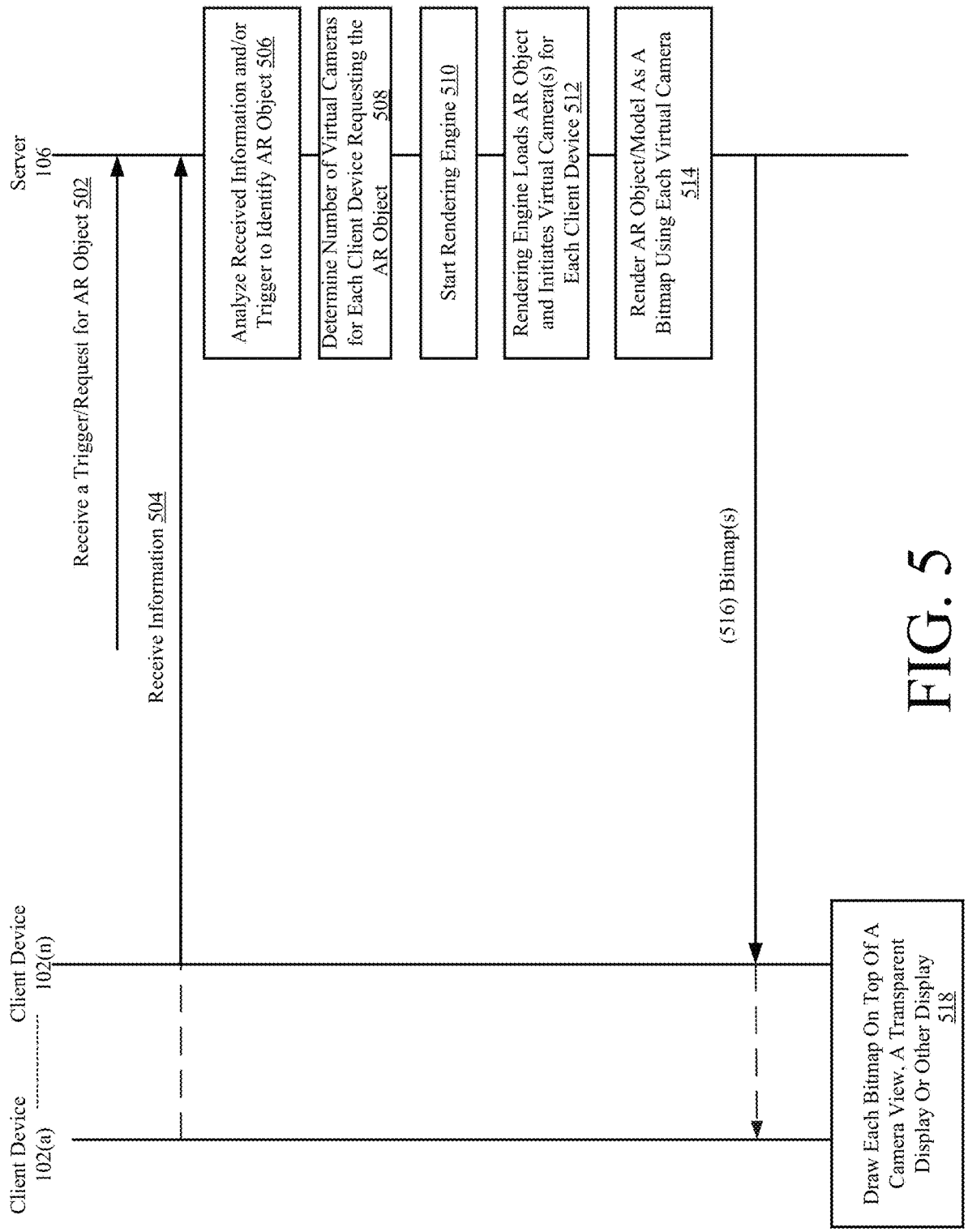
FIG. 5 is a message flow that is useful for understanding operations of the system shown in FIG. 1.

Collaborative image generation operations of the system of FIG. 1 will now be described with respect to FIG. 5. During operation, the server 106 may be triggered and/or may receive a request for placement of an AR object from one or more of a plurality of client devices 102*a-n* in their respective AR views, as shown by 502, where the client devices are collaborating in viewing and/or interacting with the AR object. Alternatively and/or additionally, the server 106 may be triggered and/or may receive a request for placement of an AR object in the AR view presented to a second client device, where an AR session including the AR object has already been established for at least one first client device 102 as discussed above with respect to FIG. 2.

As discussed above, the server 106 may determine that a request for AR object has been received based on a detected position, detected position change, or detected/determined context of user and/or client device 102. Such AR content may also be provided to a client device 102 based upon explicit requests received from the client device or based on a detected and/or recognized object within a field of view of an imaging device associated with the client device 102 (e.g., markers). Further, any suitable trigger may be used to initiate transfer and/or updating of AR content provided to a client device 102 by the server system 106.

Upon triggering or receiving a request to show/place an AR object, the server 106 may receive additional information from each client device 102a-n that requires the AR object in 504. Examples of such additional information may include, without limitation, client device credentials, context information for the AR environment of a user of the client device, user information, AR object identifier and initial parameters that indicate an initial orientation and scaling of the requested AR object with respect to a camera, anchor point information (e.g., x, y, z coordinates), information relating to the already established AR session, or the like. The server may use the received information to identify the AR object in 506 (by, for example, accessing the AR object catalog or from the already established AR session). Alternatively and/or additionally, the server may identify the anchor point using context of the client devices 102a-n (as described below with respect to tagged objects in local maps).

The additional information may also include information relating to each client device 102a-n such as, without limitation, whether or not a client device is configured to support stereoscopic view (e.g., an HMD device), whether or not a user associated with a client device has requested a stereoscopic AR session, or the like.

The server 106 may then determine, for each client device 102a-n that requires the AR object, the number of virtual cameras to be initiated for rendering the AR object in 508. The number of virtual cameras to be initiated may depend on the type of client device. For example, if the client device 102 is configured to support stereoscopic view (e.g., an HMD), the server 106 may initiate two virtual cameras for rendering two images of the AR object —one for the right eye display of the client device 102 and another for the left eye display of the client device 102. However, if the client device 102 is not configured to support stereoscopic view, the server 106 may initialize only one virtual camera for rendering the AR object. The server 106 may identify the type of client device based on, for example, information received from the client device 102 (e.g., type of client device), context information corresponding to the client device, user information, user instructions requesting a stereoscopic display, or the like.

The server 106 then starts a rendering at 510. The rendering engine loads the identified AR object and initiates the determined number of virtual cameras for each client device 102a-n at 512. For each client device that is configured to support a stereoscopic view and/or has received a user request for a stereoscopic view, the rendering engine also initiates a distance "D" between two virtual cameras initiated for such client device (as discussed above). The pose (e.g., scope and orientation) of each virtual camera is set so that the scale and orientation of the AR object looking through the virtual cameras matches the received initial orientation and scaling specified in the request. Furthermore, each client device 102a-n is associated with its own virtual camera (stereoscopic view not supported and/or not requested) and/or pair of virtual cameras (stereoscopic view supported and/or requested). The pose of each such virtual camera or pair of virtual cameras is individually controlled by the position, movement, localization, context, etc. its associated client device irrespective of the other client devices collaborating in the AR session. Similarly, the distance "D" for each client device may be determined independently of other client devices, and based only on the perceived depth requirement for that client device.

The rendering engine renders the AR object as a separate bitmap using each initialized virtual camera for each client device 102a-n, as shown by 514. Each rendered bitmap is then sent to the respective client device 102a-n in 516. For example, a single rendered bitmap is sent to a client device if the client device is a video see-through system, and two rendered bitmaps are sent to a client device if the client device is an optical see-through system (one for the right eye display and one for the left eye display)

Upon receiving the rendered bitmap(s), each client device 102a-n overlays the bitmap(s) on top of a real camera view, a transparent display or other display(s) of that client device in 518. For example, bitmap(s) may be drawn in a display screen at the location of the anchor point that is being tracked using SLAM by each client device separately and distinctly from other client devices. Alternatively, the location of the anchor point may be tracked using previously stored local maps (described below).

For example, a single rendered bitmap of the AR object is drawn on the video display of a client device 102 that does not support stereoscopic view, and is viewed as a single AR image on the display of that client device. On the other hand, two rendered bitmaps are drawn on each display (left eye display and right eye display) of a client device that is configured to support stereoscopic view which are subsequently perceived by the user as a stereoscopic image of the AR object at a desired depth. Specifically, the left AR bitmap and right AR bitmap create a stereoscopic image of the AR object when viewed by a wearer of, for example, a HMD. The perceived AR object has an apparent real world size and an apparent real world depth determined by the size and location of each of the left rendered bitmap and right rendered bitmap on its respective display.

In this manner, each client device may use local cameras to provide visual backdrop and 3D reference system for that client device for display of a common AR object for collaborative work or presentation. However, the server performs the rendering of the AR object such that the computing resources of the client devices 102a-n are not overburdened for rendering the AR object locally. Each client device user may have the ability to manipulate and explore the AR object presented in their personal environment and registered to their local real world views. Optionally, only one primary client device may manipulate and explore the AR object, which manipulations and explorations are then transmitted to the server, and applied to the stored AR object model. The updated AR model may be re-rendered by the server (as described above with respect to FIG. 4) and transmitted to the secondary client devices to present the modified AR object in their personal environment and registered to their local real world views.

Alternatively and/or additionally, one or more secondary client devices may share a real-world view provided by one primary client device (e.g., of a presenter or speaker). In such a scenario, a primary client device may exert an override ability locking the view of each secondary client device to match the view of the primary client device and/or may override secondary client device interface in order to directly control what a user of each secondary client device views.

In certain embodiments, any user interactions with the AR object made by a user of a client device (e.g., client device 102a) may be transmitted to the AR views of the other client devices 102b-n registered to their local real world views, without any changes to the underlying real word images of the AR views presented on the client devices 102a-n. Specifically, a user may then be able to control the AR content displayed to other users—for example by rotating or zooming the AR content, drawing on it, or otherwise enhancing it.

For example, in an AR session where the AR object is an architectural floor plan of a building being presented as an AR view to multiple users (whether remote or located in the same physical environment such as, for e.g., architects, engineers, plumbers, etc. collaborating on an architectural floor plan) as overlaid over their real world environment, if one user interacts with the floor plan and makes edits to the floor plan, such edits may be seamlessly displayed to the other users of the AR session without any changes to the real world perspective presented to each user. This may be accomplished by re-rendering (at the server) at least a part of the bitmap of the modified AR object based on the edits of a user using the virtual camera(s) associated with each client device individually as discussed above.

Figure 6:
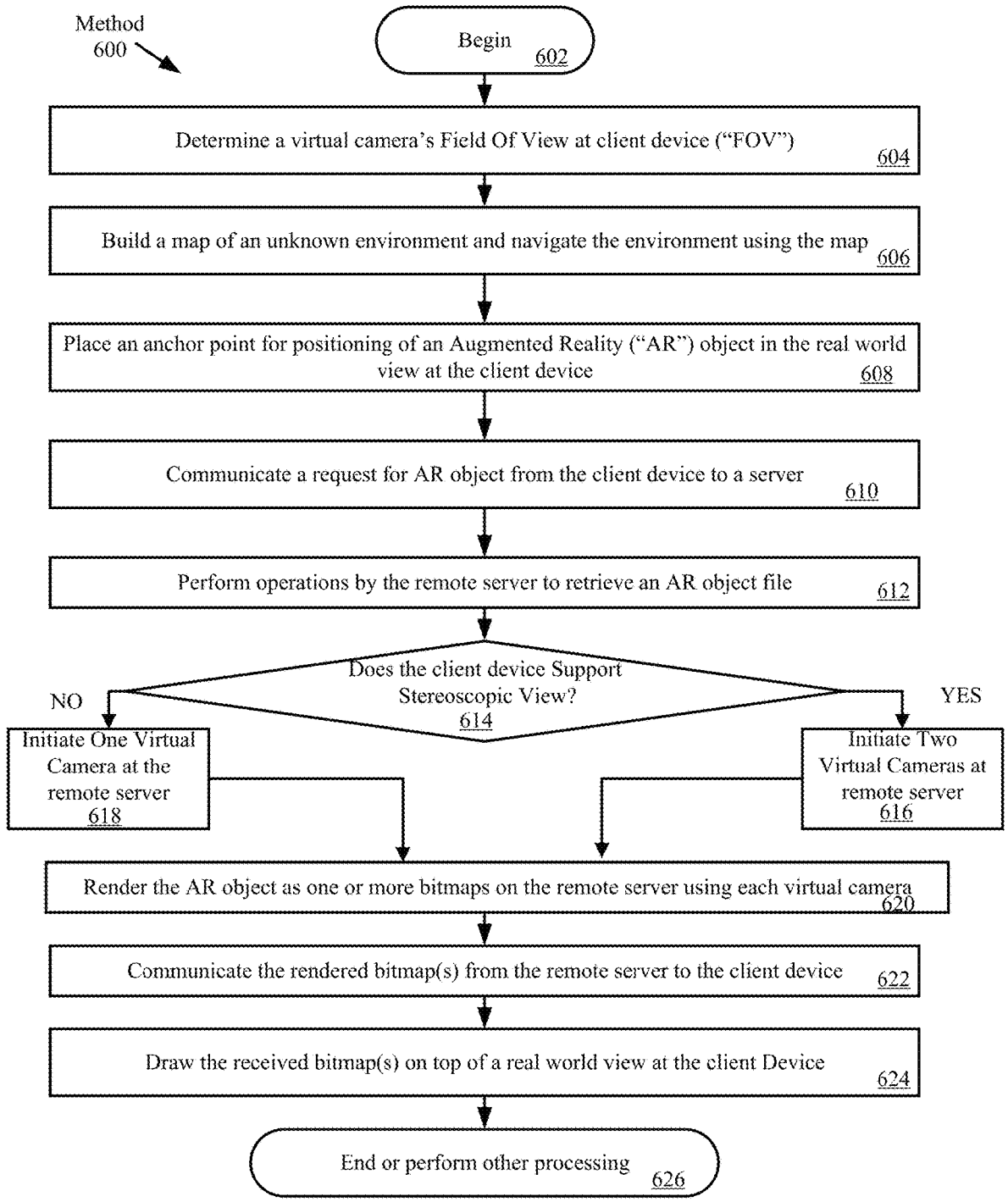
FIG. 6 provides a flow diagram of an illustrative method for AR object rendering in a virtualized environment.

Referring now to FIG. 6, there is provided a flow diagram of an illustrative method 600 for AR object rendering in a virtualized environment. Method 600 begins with 602 and continues with 604 where a client device (e.g., client device 102 of FIG. 1) (which may be roaming or otherwise moving) performs operations to determine a virtual camera's FOV. In 606, SLAM operations are performed by the client device to build a map of an unknown environment while simultaneously navigating the environment using the map. The client device then performs operations in 608 to place at least one anchor point so that an object's position relative to some other object in the real world remains the same during resizing and/or rotation. Next in 610, a request for an AR object is sent from the client device to the server. Optionally, the map may be received from the server in the form of a previously stored local map of a physical location. Additionally and/or alternatively, the local map may include tagged objects present in the physical location which may be used to infer the location of the anchor point (described below).

In response to the request, the server retrieves the AR object from a datastore (e.g., datastore 108 of FIG. 1), as shown by 612. The server also determines whether the client device is configured to support a stereoscopic view and/or if the user has requested a stereoscopic view at 614. If the client device is determined to configured to support a stereoscopic view and/or if the user has requested a stereoscopic view (614: YES), the sever may initialize two virtual cameras for rendering the AR object (a left display virtual camera and a right display virtual camera) at 616. As discussed above, the distance between the cameras may be configured to provide a stereoscopic view of the AR object through the optical see-through system. However, if the client device is not determined to configured to support a stereoscopic view and/or if the user has not requested a stereoscopic view (614: NO), the server initializes only one virtual camera (618). The AR object is then rendered in 620 by a rendering engine (e.g., rendering engine 904 of FIG. 9) of the server as one or more bitmaps using the initialized virtual camera(s). The rendered bitmap(s) is/are communicated from the server to the client device in 622. At the client device, the received bitmap(s) is/are drawn on top of a camera view, a transparent display or other display using the anchor point placed in 608, as shown by 624. As discussed above, if two bitmaps are drawn over the left camera view and the right camera view, the user may view them simultaneously and perceive the AR object at a desired depth from the client device. Subsequently, 626 is performed where method 600 ends or other processing is performed (e.g., return to 604).

When a client device 102 renders different types of AR objects that are pushed to the client device 102 by the server 106, it may be cumbersome for a user of the client device 102 to manually register or place AR objects, for example, with the help of anchor points or visual markers (like QR code, bar code, image marker etc.) in his/her local real-world view. For example, a user must define an anchor point for locating an AR object in his real world physical environment by hand or a pointing device. However, such manual registration is inefficient requiring user intervention every time the physical environment of a user changes. Other mechanisms utilize physical markers such as QR code, bar code, image markers, etc. affixed on different surfaces/locations in the workplace to project AR content. This second mechanism is based on the assumption that work happens at a fixed location inside an office, which is not true in today's world of mobile devices and cloud computing. Furthermore, this requires upfront work to set-up the physical QR codes and other visual markers in the physical environment of a user. Finally, such registration is not portable between the mobile devices of a user.

The current solutions utilize the context of a user of a client device to create and store one or more "local maps" corresponding to the user on the server 106. Each local map may correspond to, for example, the map of physical locations that the user visits frequently (e.g., work place, meeting rooms, home, etc.). Each stored local map can include the location and/or arrangement of recognized physical objects in the environment of the user such as, without limitation, walls, table, desktop computer, furniture, cupboard etc. This local map may be updated on the server 106 when the arrangement of physical objects in the location changes.

Figure 7:
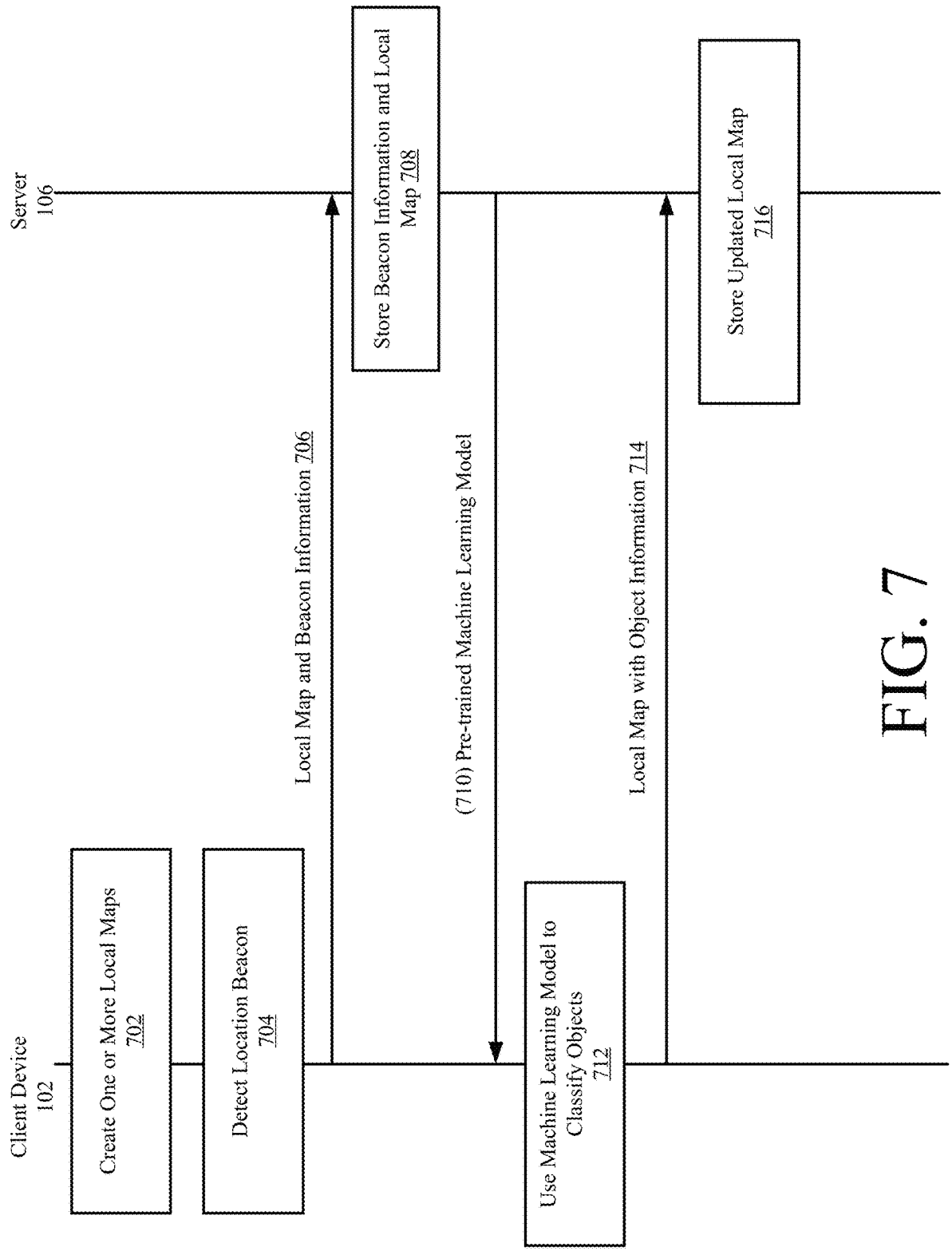
FIG. 7 is a message flow that is useful for understanding operations of the system shown in FIG. 1 for creation of a local map.

Local map generation for registration of an AR object in a physical environment will now be described with respect to FIG. 7. Referring now to FIG. 7, there is provided a flow diagram of an illustrative method 700 for AR object rendering in a virtualized environment. During operation, the client device 102 may create one or more local maps of one or more physical locations at 702. The physical locations may correspond to, for example, the places visited by a user of the client device more than a threshold number of times in a given time period. Alternatively and/or additionally, a user may identify a physical location for the client device to create a local map. For example, the location may be a residential location, a portion of a residential location, a business location, a portion of a business location, a campus of an enterprise or university, a portion of a campus of an enterprise or university, a park, a portion of a park, a town or city, a portion of a town or city, or the like, as well as various combinations thereof. The location may be of any suitable size (e.g., a room of a house, an entire house, a floor of a building, multiple floors of a building, a group of buildings, an open area outside of any buildings, a street or streets of a town or city, or the like, as well as various combinations thereof). It will be appreciated that the location may include one or more physical objects or landmarks (e.g., furniture, walls, monitors, sensors, appliances, or the like).

In certain scenarios, the client device 102 may create and store the local maps whenever an AR session is initiated on the client device. Alternatively, a user may instruct the client device to create a local map upon visiting a physical environment.

Each physical environment location of a user may also include one or more location beacons associated with that location. A location beacon may be any beacon which may be detected by the client device 102, and may enable localization of the client device in the physical environment. The location beacons may include one or more active beacons, one or more passive beacons, or the like, as well as various combinations thereof. Examples of location beacons may include, without limitation, light emitting devices (e.g., diodes, lasers, etc.); Bluetooth devices, RFID devices, or devices including other types of communication interfaces; radiation emitting devices; or the like, The client device 102 may create the local map of a physical location using, for example and without limitation, SLAM or any other mapping and localization methods known to those skilled in the art.

At 704, the client device 102 may detect a location beacon in a physical environment, and may transmit (706) the created local map and beacon information to the server 106 for storage. The server 106 may store the beacon information (e.g., beacon identifier and/or beacon location) and the corresponding local map as, for example, a key-value pair in a no-SQL database at 708. In certain embodiments, the server 106 may compress the local map prior to storage.

Optionally, the server 106 may transmit a pre-trained machine learning model to the client device 102 at 710. The pre-trained machine learning model may be trained with an object recognition training dataset to classify commonly found objects in a physical location. Alternatively and/or additionally, the pre-trained machine learning model may be trained with an object recognition training dataset to classify particular objects (for example, specific objects that a particular user may encounter). Upon receiving the machine learning model, the client device 102 runs the machine learning model to classify objects in its current physical location (712). For example, the client device 102 may run the machine learning model to classify objects in camera frames of various scenes obtained by the client device using SLAM. When an object is recognized, the client device 102 may tag all the 3D world points that are overlapping with the recognized object with a specific tag for the recognized object. The client device may add the tagged objects and their respective locations to the local map. Hence, as the client device generates the local map, it may also identify one or more objects located within the local map. The local map, therefore, also includes a number of areas (volumetric regions) that correspond to one or more recognized objects.

The client device 102 may send the local map with the tagged regions that represent recognized objects in the local map to the server 106 for storage at 714, and the server may store the received local map at 716 as a new copy associated with a beacon and/or updated previous copy of local map. In certain scenarios, a thin local map can also be formed by the client device 102 by connecting the tagged recognized objects and sent to the server 106. The server 106 can use the thin local map to find a compatible local map in the database if no location identification is provided by the client device 102. For example, if a user is associated with one or more locations, the thin map of the objects may be used to identify the current local map of the current location of the user. Such a thin map may include a representation of tagged objects connected by, for example, straight lines (or edges), where the length of the straight lines are representative of distances between the respective objects.

The client device 102 may perform creation of new local maps (if in a new physical location) and/or modification of previously existing local maps (e.g., updating the local map, tagging of new objects, updating the tagging of previously tagged objects) during AR sessions generated on the client device 102, and may transmit the new and/or updated local maps for storage to the server 106. For example, the client device may update the local map to include the map of a previously unmapped region. In another example, the client device may tag a new object that was not previously in the physical environment, and/or remove an object that is no longer present in the environment. The client device 102 may perform the foregoing in each AR session executed on the client device, after a certain number of AR sessions, and/or periodically. For example, if a previously tagged object is not present in a threshold number of AR sessions, the client device 102 may transmit a request to the server 106 to remove the object from the corresponding local map and/or update the map itself. Similarly, if a new object is identified in a threshold number of AR sessions, the client device 102 may transmit a request to the server 106 to add the identified object to the corresponding local map and/or update the map itself. Hence, the local maps and tagged regions in the local maps may be constantly updated by the client device 102.

Figure 8:
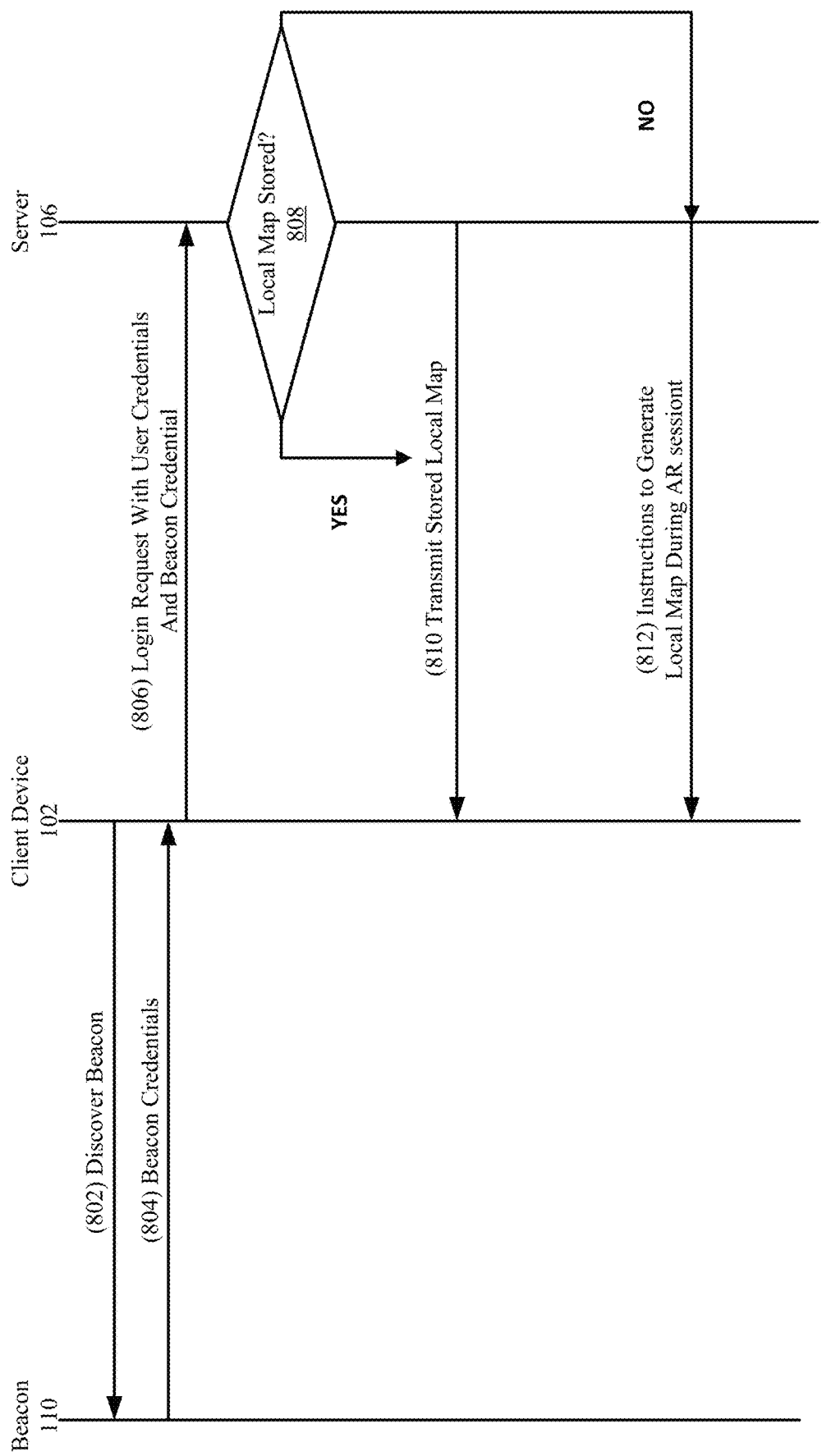
FIG. 8 is a message flow that is useful for understanding operations of the system shown in FIG. 1

Use of a local map for registration of an AR object in a physical environment will now be described with respect to FIG. 8. During operation, the client device 102 discovers a beacon 110 as shown by 802. The beacon 110 facilitates localization of the client device 102 for accessing AR content. In this regard, beacon 110 communicates beacon credentials to the client device 102 as shown by 804. The beacon credentials include, but are not limited to, a beacon identifier and/or a beacon location. The credentials for the client device 102 and the credentials for the beacon 110 are then used in 806 to login to the server 106. The client device credentials include, but are not limited to, a device identifier, a user identifier, a code, an entity identifier, a user identifier, an account number and/or a password. The client device and beacon credentials provide contextual information for the user.

Upon receipt of the beacon credentials, the server 106 may search the database to determine if the beacon identifier is associated with a previously stored local map (808). If a stored local map is found to be associated with the beacon identifier (808: YES), the server 106 transmits the local map to the client device 102 for initializing the current AR session on the client device 102 at 108. As such, the client device does not need to perform mapping and localization for the AR session at all, and/or may only perform reduced mapping and localization for updating the local map, thereby reducing consumption of computing power as well as memory space on the client device end. However, if a stored local map is not found to be associated with the beacon identifier (808: NO), the server 106 may instruct (812) the client device 102 to create and transmit a local map as described with respect to FIG. 7.

The client device 102 and the sever 106 may then generate the desired AR session for display of AR object(s), as discussed above with respect to FIGS. 2-6. Furthermore, the tagged objects may be used to place AR content where they are most relevant during the AR session without user input (i.e., an anchor point may be defined automatically). For example, if a request is received by the client device to project a 3D chart, it may projected on the empty surface of a previously tagged user's work desk in the physical location of a user's office space. Similarly, if user receives a call in his office the caller's face may be overlaid as an AR object in the upper left corner of a previously tagged desktop computer where the received the call. In another example, an AR object comprising a sitting person may be placed on an empty previously tagged chair using the information in the local map of the physical environment. Furthermore, it may be advantageous to place virtual AR objects in a certain location in the local map, and they can stay in the same location over multiple AR sessions.

Referring now to FIG. 9, there is provided an illustration of an illustrative architecture for a computing device 900. Client device 102 and/or server 106 of FIG. 1 is(are) the same as or similar to computing device 900. As such, the discussion of computing device 900 is sufficient for understanding this component of system 100.

In some scenarios, the present solution is used in a client-server architecture. Accordingly, the computing device architecture shown in FIG. 3 is sufficient for understanding the particulars of client computing devices and servers.

Computing device 900 may include more or less components than those shown in FIG. 9. However, the components shown are sufficient to disclose an illustrative solution implementing the present solution. The hardware architecture of FIG. 9 represents one implementation of a representative computing device configured to provide improved email attachment viewing, as described herein. As such, the computing device 900 of FIG. 9 implements at least a portion of the method(s) described herein.

Some or all components of the computing device 900 can be implemented as hardware, software and/or a combination of hardware and software. The hardware includes, but is not limited to, one or more electronic circuits. The electronic circuits can include, but are not limited to, passive components (e.g., resistors and capacitors) and/or active components (e.g., amplifiers and/or microprocessors). The passive and/or active components can be adapted to, arranged to and/or programmed to perform one or more of the methodologies, procedures, or functions described herein.

As shown in FIG. 9, the computing device 900 comprises a user interface 902, a Central Processing Unit ("CPU") 906, a system bus 910, a memory 912 connected to and accessible by other portions of computing device 900 through system bus 910, a system interface 960, and hardware entities 914 connected to system bus 910. The user interface can include input devices and output devices, which facilitate user-software interactions for controlling operations of the computing device 900. The input devices include, but are not limited, a physical and/or touch keyboard 950. The input devices can be connected to the computing device via a wired or wireless connection (e.g., a Bluetooth® connection). The output devices include, but are not limited to, a speaker 952, a display 954, and/or light emitting diodes 956. System interface 960 is configured to facilitate wired or wireless communications to and from external devices (e.g., network nodes such as access points, etc.).

At least some of the hardware entities 914 perform actions involving access to and use of memory 912, which can be a Random Access Memory ("RAM"), a disk driver and/or a Compact Disc Read Only Memory ("CD-ROM"). Hardware entities 914 can include a disk drive unit 916 comprising a computer-readable storage medium 918 on which is stored one or more sets of instructions 920 (e.g., software code) configured to implement one or more of the methodologies, procedures, or functions described herein. The instructions 920 can also reside, completely or at least partially, within the memory 912 and/or within the CPU 906 during execution thereof by the computing device 900. The memory 912 and the CPU 906 also can constitute machine-readable media. The term "machine-readable media", as used here, refers to a single medium or multiple media (e.g., a centralized or distributed database, and/or associated caches and servers) that store the one or more sets of instructions 920. The term "machine-readable media", as used here, also refers to any medium that is capable of storing, encoding or carrying a set of instructions 920 for execution by the computing device 900 and that cause the computing device 900 to perform any one or more of the methodologies of the present disclosure.

Computing device 900 may also comprise a rendering engine 904. The rendering engine 904 is configured to render bitmaps for AR objects using a virtual camera. The rendered bitmaps are communicated to external devices (e.g., client device 102 of FIG. 1) via system interface 960.

The above-described solution can be used in many applications. The above solution may be used for providing a fully immersive stereoscopic view of an object to a user using an optical see-through system (e.g., a HMD), and adjusting the depth perception in the stereoscopic view based on the position of the user with respect to the AR object.

The present solution may also be used for sharing an AR environment having both static and dynamic AR objects with another user. Dynamic objects may best be streamed directly from the server while static AR objects can be rendered locally for high fidelity and fluid experience.

The present solution can be used to pre-store maps of user's physical environments for conserving computing power during an AR session. The stored maps can also be used to automatically identify anchor points for positioning the AR object.

Although the present solution has been illustrated and described with respect to one or more implementations, equivalent alterations and modifications will occur to others skilled in the art upon the reading and understanding of this specification and the annexed drawings. In addition, while a particular feature of the present solution may have been disclosed with respect to only one of several implementations, such feature may be combined with one or more other features of the other implementations as may be desired and advantageous for any given or particular application. Thus, the breadth and scope of the present solution should not be limited by any of the above described embodiments. Rather, the scope of the present solution should be defined in accordance with the following claims and their equivalents.

What is claimed is:

1. A method for rendering an Augmented Reality ("AR") object comprising:
   determining, for placement of an AR object, an anchor point based on a map of a physical environment of a client device, wherein the map comprises a plurality of tagged objects in the physical environment of the client device;
   overlaying, on a first display of the client device, a first bitmap of the AR object, wherein the first bitmap was rendered, based on the anchor point, by a first virtual camera initialized by a server; and
   overlaying, on a second display of the client device, a second bitmap of the AR object, wherein the second bitmap was rendered, based on the anchor point, by a second virtual camera initialized by the server,
   wherein the first bitmap and the second bitmap appear as the AR object being located at a depth distance from the client device in a stereoscopic view.

2. The method of claim 1, wherein the first virtual camera is located at a distance from the second virtual camera, and wherein the distance is based on the anchor point.

3. The method of claim 2, further comprising:
   adjusting the distance in response to receiving user feedback.

4. The method of claim 2, further comprising:
causing, based on movement of the client device with respect to the anchor point, the server to adjust the distance.

5. The method of claim 4, further comprising:
causing the server to render the AR object as an updated first bitmap and an updated second bitmap.

6. The method of claim 5, further comprising:
overlaying the updated first bitmap on the first display of the client device; and
overlaying the updated second bitmap on the second display of the client device.

7. The method of claim 1, further comprising:
sending, to the server, an indication of whether the client device is configured to support the stereoscopic view.

8. The method of claim 6, wherein the client device is a head mounted display (HMD).

9. The method of claim 1, wherein the first display is either a left eye display of the client device or a right eye display of the client device, and the second display is other one of the left eye display or the right eye display of the client device.

10. The method of claim 1, further comprising:
receiving the map corresponding to the physical environment of the client device.

11. The method of claim 1, further comprising:
causing the server to receive a request from a second client device to visualize the AR object;
causing the server to render a third bitmap of the AR object by at least a third virtual camera initialized by the server; and
causing the second client device to overlay, on a third display of the second client device, the third bitmap of the AR object.

12. The method of claim 11, wherein causing the server to render the third bitmap comprises causing the server to render the third bitmap such that the AR object is perceived by the second client device as within a second physical environment of the second client device.

13. The method of claim 11, further comprising:
causing the server to render, in response to manipulation of the AR object, a fourth bitmap of the AR object by the third virtual camera; and
causing the second client device to overlay, on the third display of the second client device, the fourth bitmap.

14. The method of claim 1, further comprising:
overlaying, on the first display of the client device and based on a change of the AR object, a fourth bitmap rendered by the first virtual camera; and
overlaying, on the second display of the client device and based on the change of the AR object, a fifth bitmap rendered by the second virtual camera.

15. A non-transitory computer readable medium comprising instructions that, when executed by a processor, cause the processor to:
determine, for placement of an AR object, an anchor point based on a map of a physical environment of a client device, wherein the map comprises a plurality of tagged objects in the physical environment of the client device;
overlay, on a first display of the client device, a first bitmap of the AR object, wherein the first bitmap was rendered, based on the anchor point, by a first virtual camera; and
overlay, on a second display of the client device, a second bitmap of the AR object, wherein the second bitmap was rendered, based on the anchor point, by a second virtual camera,
wherein the first bitmap and the second bitmap appear as the AR object being located at a depth distance from the client device in a stereoscopic view.

16. The non-transitory computer readable medium of claim 15, wherein the first virtual camera is located at a distance from the second virtual camera, and wherein the distance is based on the anchor point.

17. A method comprising:
providing, by a server, at least two virtual cameras to generate an augmented reality (AR) model of a virtual object;
determining, for placement of an AR object, an anchor point based on a map of a physical environment of a client device, wherein the map comprises a plurality of tagged objects in the physical environment of the client device;
determining, by the server, a distance between the at least two virtual cameras based on the anchor point; and
providing, by the server and based on the anchor point and the distance, information to the client device for displaying the virtual object as the AR model.

18. The method of claim 17, further comprising:
receiving by the server, user feedback for adjusting the distance.

19. The method of claim 17, further comprising:
receiving, from the client device, information relating to a change in the anchor point; and
determining, based on the change, an updated distance between the at least two virtual cameras; and
providing, based on the updated distance, second information to the client device for displaying the virtual object as the AR model.

20. A client device comprising:
a first display;
a second display;
one or more processors; and
memory storing instructions, that when executed by the one or more processors, cause the one or more processors to:
overlay a first bitmap image of an AR object on the first display, wherein the first bitmap image was rendered, by a server and based on an anchor point, using a first virtual camera, and wherein the anchor point was determined, by the server, based on a map corresponding to a physical environment of the client device, wherein the map comprises a plurality of tagged objects in the physical environment of the client device; and
overlay a second bitmap image of the AR object on the second display, wherein the second bitmap image was rendered, by the server and based on the anchor point, using a second virtual camera, wherein the first bitmap image and the second bitmap image are configured to appear as if the AR object is located at a depth distance from the client device in a stereoscopic view, and wherein the depth distance is a function of a first distance between the first virtual camera and a second virtual camera rendered by a server.

21. The client device of claim 20, wherein the instructions, when executed by the one or more processors, further cause the client device to:

receive, from the server, the first bitmap image and the second bitmap image.

22. The client device of claim 20, wherein the first display is either a left eye display of the client device or a right eye display of the client device, and wherein the second display is other one of the left eye display or the right eye display of the client device.

23. A device comprising:
one or more processors; and
memory storing instructions that, when executed by the one or more processors, cause the device to:
provide at least two virtual cameras to generate an augmented reality (AR) model of a virtual object, the at least two virtual cameras being separated by a distance;
determine, for placement of an AR object, an anchor point based on a map of a physical environment of a client device, wherein the map comprises a plurality of tagged objects in the physical environment of the client device;
determine the distance between the at least two virtual cameras based on a depth distance of the anchor point of the virtual object from the client device; and
provide, based on the anchor point and the distance, information from the at least two virtual cameras to the client device for displaying the virtual object as the AR model at the anchor point in a stereoscopic view in the physical environment of the client device.

24. The device of claim 23, wherein the instructions, when executed by the one or more processors, further cause the device to:
receive user feedback for adjusting the distance.

25. The device of claim 23, wherein the instructions, when executed by the one or more processors, further cause the device to:
receive, from the client device, information relating to a change in the depth distance of the anchor point;
determine, based on the change, an updated distance between the at least two virtual cameras; and
provide, based on the updated distance, second information to the client device for displaying the virtual object as the AR model.

26. The device of claim 23, wherein the instructions, when executed by the one or more processors, further cause the device to:
receive, from a second client device, a request to visualize the AR model;
render the AR model by at least a third virtual camera; and
transmit the AR model to the second client device for display, wherein a pose of the third virtual camera is constrained to the second client device such that the AR model is perceived by the second client device within a second physical environment of the second client device.

* * * * *